A. A. HOFFMAN.
FLOAT VALVE.
APPLICATION FILED DEC. 1, 1909.
1,093,418.
Patented Apr. 14, 1914.
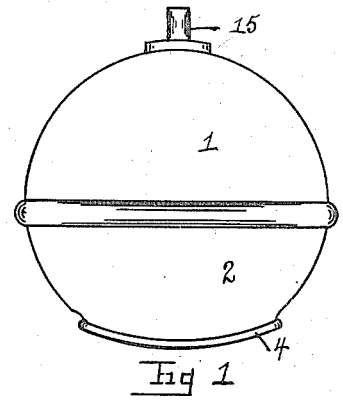
Fig 1
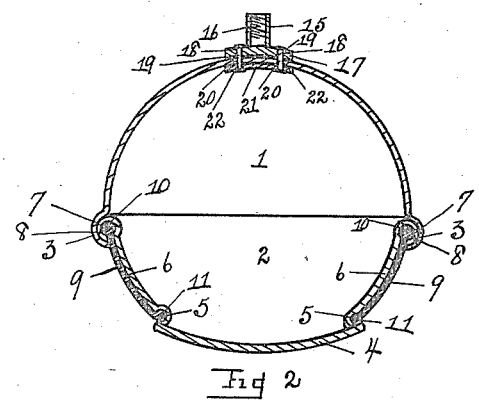
Fig 2
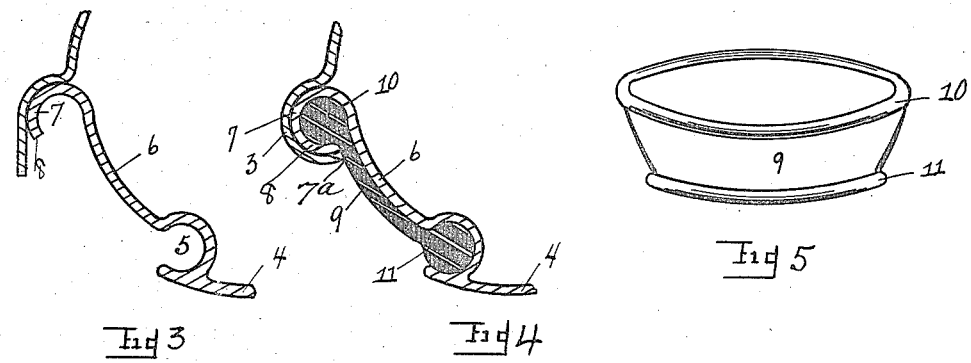
Fig 3
Fig 4
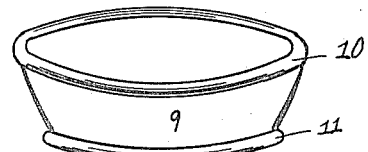
Fig 5
WITNESSES:
J. L. Wilder
D. E. Jackson
INVENTOR
ANDREW A. HOFFMAN
BY Risley Love
ATTORNEYS

UNITED STATES PATENT OFFICE.

ANDREW A. HOFFMAN, OF ROME, NEW YORK, ASSIGNOR TO ROME SANITARY COMPANY, OF ROME, NEW YORK.

FLOAT-VALVE.

1,093,418.   Specification of Letters Patent.   Patented Apr. 14, 1914.

Application filed December 1, 1909. Serial No. 530,754.

*To all whom it may concern:*

Be it known that I, ANDREW A. HOFFMAN, citizen of the United States, residing at Rome, in the county of Oneida and State of New York, have invented certain new and useful Improvements in Float-Valves, of which the following is a specification, reference being had therein to the accompanying drawing.

My invention relates to an improved float-valve, and I declare the following to be an exact, concise and full description thereof, sufficient to enable one skilled in the art to make and use the same, reference being had to the accompanying drawings in which like reference characters refer to like parts throughout.

The object of my invention is to provide a float-valve as used in water-closets and other tanks for automatically closing the tank outlet or discharge.

The invention contemplates an improvement over rubber float-valves, which when immersed in water, will soon bulge, flatten or become elongated and lose their usefulness. Such defects arise from the fact that the float is not constructed with proper combination, and arrangement of parts.

In the drawings, Figure 1, is a view of the float-valve. Fig. 2, is a vertical sectional view of the same. Fig. 3, is a partial sectional view of the lower portion of the valve, showing the metal portion alone, while Fig. 4, is a like view with the gasket shown in position. Fig. 5, is a perspective view of the gasket.

Referring to the drawings in detail, the upper and lower portions of the valve body shown by 1 and 2, are united by proper means, or desirable construction.

The lower portion of the valve, that is part 2, is formed at its upper edge in the shape of a circumferential scroll 7. The contiguous or lower edge of the upper portion 1, is formed with a like scroll, but of such size as to inclose or surround the scroll of the lower portion. Around its lower portion, part 2 is formed with an outwardly-opening circumferential groove as indicated at 5 in Fig. 3, which groove is, in a sense, oppositely disposed to the groove formed by the curved upper edge of this part 2.

A rubber gasket or cover 9, is provided to be mounted on the lower portion, it being held in place by having one enlarged edge 11 crowded into the groove 5, and the upper edge, similarly enlarged as at 10, to be inclosed by the edges 7 and 3, of the contiguous hemispheres, when they are bent around into the position shown in Fig. 4.

The flexible or elastic material gasket or cover will engage the valve seat surrounding the outlet 8, and prevent the outflow of water, while the valve body forms a support or backing for said gasket, although it is obvious that the intermediate portion of the gasket between the enlarged edges 10, 11, can fit, or be arranged, more or less snugly to, or closely around the outer surface of the valve body.

In the process of constructing this float-valve, the two parts are spun so that their edges and the base of the lower part, have the form shown in cross-section in Fig. 3. In the completion of the process, the cover or gasket 9, being put in place, the edges 7 and 3 of the two hemispheres will be spun to inclose the part 10, so that the cover or gasket 9 will be held securely in place.

Having described my invention what I claim as new and desire to secure by Letters Patent is:

1. In a device of the character described, the combination of hemispheres, one of said hemispheres having a groove formed in its side adjacent its base, and having its remote edge curved in the form of a peripheral groove and a cover formed with enlarged edges each adapted to fit into the adjacent groove, the last-named curved portion of the hemisphere being inclosed by a correspondingly curved portion of the other of said hemispheres.

2. In a float valve of the character described, the combination of hemispheres, one of said hemispheres having a base portion and a side portion united to form a groove let into the surface of the hemisphere, the latter hemisphere having its edge formed in a circumferential groove or flange, the other of said hemispheres formed with a circumferential groove adapted to inclose the adjacent edge of the first mentioned hemisphere, and a cover having its edges enlarged to seat within said grooves.

3. In a float valve, the combination with a body portion having a curved exterior surface and outwardly-opening circumferential grooves therein, of a cover adapted to be supported on the body by engagement of its edges in said grooves.

4. In a float valve, the combination of hemispheres, one of said hemispheres having its edge curved outwardly adapted to contain the edge of a cover mounted on the outside of the float, and the other of said hemispheres having its edge curved in a manner adapted to form a closure for the curved edge of the aforementioned hemisphere, and the adjacent edge of the said cover and said cover, substantially as described.

5. In a float valve, the combination with a valve body, of a cover inclosing a portion of the side wall of the lower portion of said body and means formed by the shaping of said body engaging the cover and retaining it in place, said cover having enlarged edges held close to the body by said engaging means.

In testimony whereof I hereunto affix my signature in the presence of two witnesses.

ANDREW A. HOFFMAN.

Witnesses:
 ERWIN L. HOCKRIDGE,
 T. L. WILDER.